(12) United States Patent
Nakamura et al.

(10) Patent No.: US 7,638,460 B2
(45) Date of Patent: Dec. 29, 2009

(54) EXHAUST GAS PURIFYING CATALYST AND METHOD OF MANUFACTURING THE SAME

(75) Inventors: Masanori Nakamura, Yokosuka (JP); Katsuo Suga, Yokohama (JP); Kiyoshi Miyazaki, Yokohama (JP); Jun Ikezawa, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 328 days.

(21) Appl. No.: 11/586,514

(22) Filed: Oct. 26, 2006

(65) Prior Publication Data

US 2007/0099796 A1    May 3, 2007

(30) Foreign Application Priority Data

Oct. 28, 2005    (JP)    ............................... 2005-314519

(51) Int. Cl.
| B01J 23/00 | (2006.01) |
| B01J 21/00 | (2006.01) |
| B01J 20/00 | (2006.01) |
| B01J 29/00 | (2006.01) |
| B01J 37/00 | (2006.01) |

(52) U.S. Cl. ........................ 502/326; 502/258; 502/261; 502/262; 502/263; 502/302; 502/303; 502/304; 502/327; 502/332; 502/333; 502/334; 502/339; 502/349; 502/350; 502/355; 502/415; 502/439; 502/527.13; 502/527.14; 502/527.15; 502/527.16; 502/527.17; 502/527.19

(58) Field of Classification Search ................. 502/258, 502/261, 262, 263, 302, 303, 304, 326, 327, 502/332, 333, 334, 339, 349, 350, 355, 415, 502/439, 527.13, 527.14, 527.15, 527.16, 502/527.17, 527.19
See application file for complete search history.

(56) References Cited

U.S. PATENT DOCUMENTS

| 4,839,146 A | * | 6/1989 | Cho et al. ................. 423/213.5 |
| 5,318,757 A | * | 6/1994 | Abe et al. .................... 422/174 |
| 5,610,117 A | * | 3/1997 | Horiuchi et al. ............. 502/324 |
| 5,958,829 A |   | 9/1999 | Domesle et al. |
| 6,180,075 B1 | * | 1/2001 | Lindner et al. ........... 423/213.2 |
| 6,440,378 B1 | * | 8/2002 | Hirata et al. ............. 423/239.1 |
| 2002/0132730 A1 |  | 9/2002 | Hwang et al. |
| 2005/0014638 A1 |  | 1/2005 | Miura |
| 2006/0166820 A1 |  | 7/2006 | Ogyu et al. |

FOREIGN PATENT DOCUMENTS

| EP | 1 046 423 A2 | 10/2000 |
| EP | 1 598 102 A1 | 11/2005 |
| EP | 1 634 646 A1 | 3/2006 |
| JP | 2001-104783 A | 4/2001 |
| JP | 2002-239393 A | 8/2002 |
| WO | WO 2004/076027 A1 | 9/2004 |

* cited by examiner

*Primary Examiner*—Can N Nguyen
(74) *Attorney, Agent, or Firm*—Foley & Lardner LLP

(57) ABSTRACT

An exhaust gas purifying catalyst of the present invention has a substrate, and a catalyst layer formed on an inner wall of the substrate and composed of at least a single layer. The catalyst layer contains a carrier supporting noble metal. Further, a maximum height of profile of a surface of a top layer in the catalyst layer is not less than 2 μm and not more than 50 μm, and the top layer contains the carrier supporting noble metal.

12 Claims, 5 Drawing Sheets

EXHAUST GAS PURIFYING CATALYST AND METHOD OF MANUFACTURING THE SAME

BACKGROUND OF THE INVENTION

1. Field of the Invention

The present invention relates to an exhaust gas purifying catalyst which purifies exhaust gas discharged from automobile engines and relates to a method of manufacturing the exhaust gas purifying catalyst.

2. Description of the Related Art

An exhaust gas purifying catalyst converts hazardous gas contained in exhaust gas, such as hydrocarbon (HC), carbon monoxide (CO), and nitrogen oxides ($NO_x$), into nonhazardous water and gas with catalysis of noble metal, such as platinum (Pt), palladium (Pd), and rhodium (Rh). A widely-known exhaust gas purifying catalyst has a structure in which a substrate has a honeycomb structure with a number of through-holes formed and a catalyst layer is formed on a wall of each through-hole. In this catalyst layer, noble metal such as Pt, Pd, and Rh is supported by a carrier made of oxide.

As a conventional exhaust gas purifying catalyst, the following catalyst (see Japanese Patent Unexamined Publication No. 2001-104783) is disclosed. A first layer composed of inorganic oxide is formed on the substrate, and a second layer composed of an inorganic fiber material to catch granular materials contained in exhaust gas is formed on the first layer. A catalytic component thereof is supported at least in the first layer. In the second layer of this exhaust gas purifying catalyst, the inorganic fiber material has a mesh structure in order to catch the granular materials such as soot contained in exhaust gas of diesel engines.

SUMMARY OF THE INVENTION

However, the second layer of the Japanese Patent Unexamined Publication No. 2001-104783 cannot exert sufficient catalysis because the second layer supports little noble metal. Moreover, even if noble metal is supported on the inorganic fiber material, particles of such noble metal are heat-aggregated during a long term use, so that the performance thereof is reduced.

Furthermore, in the conventional exhaust gas purifying catalyst, the inner walls of the through-holes of the substrate are formed to be smooth. The catalyst layer, which is formed by applying oxide powder supporting noble metal to the inner walls, followed by drying and baking, also has a smooth surface. The exhaust gas flowing in each through-hole of the substrate therefore flows on the surface of the catalyst layer as laminar flow. Accordingly, gas diffusion in a direction orthogonal to the direction that the exhaust gas flows in each through hole, that is, gas diffusion into the catalyst layer is not sufficient, thus resulting in a problem that noble metal in the catalyst layer is less likely to come into contact with the exhaust gas.

The present invention was made in the light of the aforementioned problems of the conventional arts, and an object of the present invention is to provide an exhaust gas purifying catalyst with purification performance improved by increasing a frequency that the catalyst layer and the exhaust gas come into contact with each other and provide a method of manufacturing the same.

The first aspect of the present invention provides an exhaust gas purifying catalyst comprising: a substrate; and a catalyst layer formed on an inner wall of the substrate and composed of at least a single layer, the catalyst layer containing a carrier supporting noble metal, wherein a maximum height of profile of a surface of a top layer in the catalyst layer is not less than 2 µm and not more than 50 µm, and the top layer contains the carrier supporting noble metal.

The second aspect of the present invention provides a method of manufacturing an exhaust gas purifying catalyst comprising: preparing a powder of a carrier which supports noble metal and is composed of oxide; preparing a slurry containing the powder of the carrier and a roughening material; and applying the slurry on an inner wall of a substrate, followed by drying and baking to form a catalyst layer.

BRIEF DESCRIPTION OF THE DRAWINGS

The invention will now be described with reference to the accompanying drawings wherein.

DETAILED DESCRIPTION OF THE PREFERRED EMBODIMENT

Hereinafter, description will be made of embodiments of the present invention with reference to the drawings.

Figure 1A:
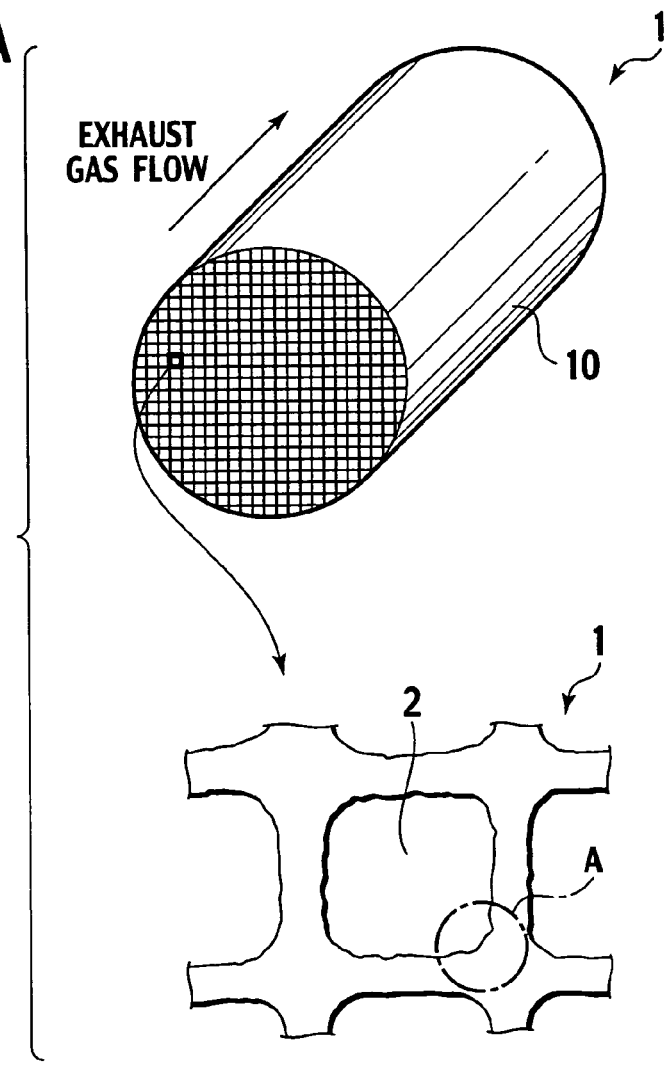
FIG. 1A shows a schematic view of an example of an exhaust gas purifying catalyst of the present invention and a main portion thereof.
Figure 1B:
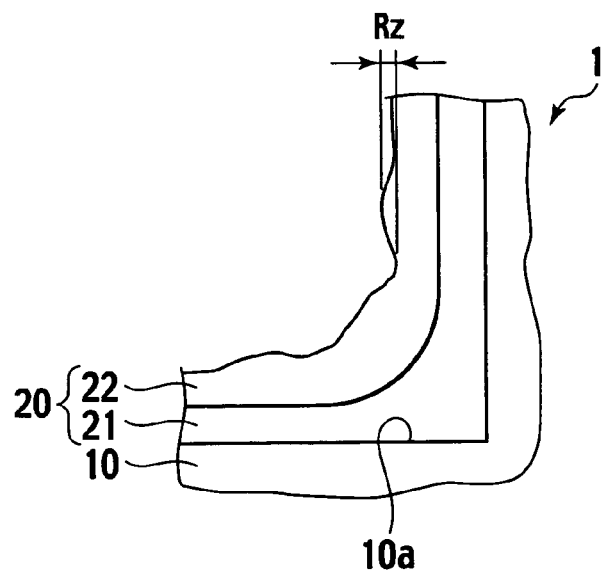
FIG. 1B is an enlarged view of an area A shown in FIG. 1A.

FIGS. 1A and 1B schematically show an example of an exhaust gas purifying catalyst of the present invention. FIG. 1A shows the exhaust gas purifying catalyst having a honeycomb structure with a number of through-holes 2 and shows a cell of the exhaust gas purifying catalyst and surroundings thereof. The flow direction of exhaust gas flowing in the through-holes 2 is a direction perpendicular to the paper. FIG. 1B shows an enlarged view of an area A shown in FIG. 1A. The exhaust gas purifying catalyst includes a heat-resistant substrate 10 composed of cordierite and a catalyst layer 20 formed on an inner wall 10a of the substrate 10. In the example shown in the drawing, the catalyst layer 20 includes a first catalyst layer 21 in contact with the wall 10a of the substrate 10 and a second catalyst layer 22 formed on the surface of the first catalyst layer 21.

In the catalyst layer 20, the second catalyst layer 22 corresponding to the top layer has roughness formed on the surface thereof. Height of the roughness (maximum height of profile (Rz)) is a distance Rz from a lowest recessed portion to a highest protruding portion in a cross-sectional view of the second catalyst layer 22 as shown in the drawing. In the present invention, the maximum height of profile (Rz) is not less than 2 µm and not more than 50 µm. In this specification, the definition of the maximum height of profile (Rz) complies with JIS B0601 (ISO 4287).

When the surface of the catalyst layer is smooth and has a maximum height of profile (Rz) of less than 2 µm, like the conventional exhaust gas purifying catalyst, exhaust gas becomes laminar flow flowing on the surface of the catalyst. In such a case, exhaust gas little diffuses in a thickness direction of the catalyst layer, which is orthogonal to the flowing direction of the exhaust gas, and the catalytic component is less likely to come into contact with the exhaust gas.

On the other hand, in the exhaust gas purifying catalyst of the present invention, the surface of the top layer of the catalyst layer has roughness, and the maximum height of profile (Rz) thereof is not less than 2 μm and not more than 50 μm. The rough surface of the top layer makes the flow of exhaust gas passing through the through-holes turbulent. Diffusion of the exhaust gas in each through-hole is performed over the entire length from the inlet to the outlet of the through-hole. The catalytic component of the catalyst layer therefore comes into frequent contact with exhaust gas, thus increasing the purification performance of the exhaust gas purifying catalyst. When the catalyst layer is composed of a single layer, the top layer of the catalyst layer indicates the single layer, and when the catalyst layer is composed of a plurality of layers, the top layer thereof indicates the outermost layer which comes into contact with exhaust gas.

As described above, in the present invention, with regard to the roughness formed in the surface of the top layer of the catalyst layer, the maximum height of profile (Rz) is designed to be not less than 2 μm and not more than 50 μm. Note that cracks of the catalyst layer are not contained in the roughness of the exhaust gas purifying catalyst according to the present invention and are not included in the measurement of the maximum height of profile (Rz). The cracks are portions of the catalyst layer unintentionally broken because of failure in formation of the catalyst layer by application. When the maximum height of profile (Rz) is within the aforementioned range, the flow of exhaust gas is turbulent, and the frequency of contact between the exhaust gas and the catalytic component increases, thus increasing the purification performance of the exhaust gas purifying catalyst. In order to cause the turbulence, the maximum height of profile (Rz) needs to be at least about 2 μm. However, when the maximum height of profile (Rz) is more than 50 μm, protrusions in the surface may exfoliate during a long term use. Accordingly, the maximum height of profile (Rz) is designed to be not less than 2 μm and not more than 50 μm, and more preferably, not less than 5 μm and not more than 20 μm.

In order to obtain the surface of the top layer of the catalyst layer with a maximum height of profile (Rz) of not less than 2 μm and not more than 50 μm, it is advantageous that the top layer of the catalyst layer is configured to contain a roughening material. Containing later-described fiber-shaped or large particle-shaped roughening materials allows the surface to be easily and surely roughened and moreover is less likely to have negative effect such as exfoliation.

As a method of roughening the surface of the top layer of the catalyst layer, a method is conceivable which forms a catalyst layer with a smooth surface on the wall of each through-hole of the substrate as usual and partially remove the catalyst layer. However, with such a method, the removed portions have no catalysis, and the entire catalysis is thought to be reduced. Moreover, remaining part of the catalyst layer gradually exfoliates starting from peripheries of the removed portions and has low durability. On the other hand, in the exhaust gas purifying catalyst of the present invention, the strength of the catalyst layer is not reduced, and the durability thereof is equal to that of the conventional one.

When the roughening material is contained in the catalyst layer, it is preferable that the roughening material is contained in a range from the surface of the top layer of the catalyst layer to the half of the total thickness of the catalyst layer in terms of the thickness direction of the catalyst layer. This is because the roughening material which is not contained in the range from the surface of the catalyst layer to the half of the total thickness has little effect on roughening the surface of the top layer. When the catalyst layer is composed of a single layer, the total thickness of the catalyst layer indicates thickness of the single layer, and when the catalyst layer is composed of a plurality of layers, the total thickness of the catalyst layer indicates the sum of thicknesses of the layers.

When a plurality of catalyst layers are provided on the wall of the substrate, containing the roughening material in the top layer of the catalyst layer allows the surface of the top layer to be roughened. The thickness ratio of the layers other than the top layer to the thickness of the top layer containing the roughening material is preferably in a range from 50/50 to 95/5. When the thickness ratio is not less than 50/50, the roughening material contained in the top layer effectively contributes roughening the surface of the top layer. When the thickness ratio of exceeds 95/5, it is difficult to design the maximum height of profile (Rz) to be not less than 2 μm and not more than 50 μm. The layers other than the top layer may contain the roughening material but does not need to contain in the light of troubles and costs in manufacturing the catalyst.

The roughening material can be fibers of an inorganic material (inorganic fibers). With regard to the inorganic fibers, needle-shaped inorganic fibers with fiber diameter prescribed and fiber length not prescribed are commercially available. The commercially available inorganic fibers of $\alpha$-$Al_2O_3$ ($\alpha$-alumina) and the like can be applied to the roughening material of the exhaust gas purifying catalyst of the present invention. The inorganic fibers are ideal for the roughening material. The catalyst layer is formed by applying slurry which contains the inorganic fibers to the wall of each through-hole of the substrate. The inorganic fibers are therefore dispersed at random in the catalyst layer to roughen the surface of the catalyst layer.

Preferably, the inorganic fibers contain 80 wt % or more of $\alpha$-$Al_2O_3$. When the roughening material is deformed by high temperature in use of the catalyst, problems including exfoliation of the catalyst layer occur. Accordingly, $\alpha$-$Al_2O_3$, which is resistant to heat and changes little at high temperature, is desirable as the inorganic fibers. The inorganic fibers containing 80 wt % or more of $\alpha$-$Al_2O_3$ does not cause the problems including exfoliation of the catalyst layer even if containing other fibers.

Preferably, cross-sectional diameter of the inorganic fibers is not less than 3 μm. This is because, in the exhaust gas purifying catalyst of the present invention, to form the roughness with a maximum height of profile (Rz) of 2 to 50 μm, desired roughness is not formed if the diameter of the inorganic fibers is less than 3 μm. The upper limit of the diameter of the fibers is a value which allows the maximum height of profile (Rz) to be 50 μm. The maximum height of profile (Rz) varies depending on an amount of the fibers, size of carrier particles supporting noble metal, the thickness of the catalyst layer, and the like. The upper limit of the diameter of the fibers can be not necessarily limited but can be 7 μm as an example under general conditions.

The roughening material can be particles of an inorganic material (inorganic particles). When the inorganic particles are applied to the roughening material, the average particle size (D50) of the inorganic particles is preferably twice or more the average particle size of the carrier particles supporting noble metal. This is because, when roughness is formed in the surface of the catalyst layer by differences in size between the carrier particles and the roughening material, desired roughness is not formed if the particle size of the inorganic particles is less than twice the particle size of the carrier particles. The upper limit of the average particle size of the inorganic particles is determined as a value which allows the maximum height of profile (Rz) of the catalyst layer to be 50 μm.

Preferably, the inorganic particles are oxide of one or more types of metal selected from aluminum (Al), cerium (Ce), zirconium (Zr), and titanium (Ti). Applying oxide used in the carrier particles supporting noble metal to the inorganic particles can suppress poisoning and enlargement of the catalytic component. Especially cerium oxide and zirconium oxide are suitable. When the roughening material is contained in the catalyst layer, the content of the catalytic component is reduced as much as the contained roughening material, and the activity of the catalyst is reduced. However, the cerium and zirconium oxides have oxygen storage capacities, and containing such oxide can compensate for such reduction in activity of the catalytic component.

To the inorganic particles, $\alpha$-$Al_2O_3$ can be applied. When the roughening material is deformed by high temperature in use of the catalyst and the like, the problem of exfoliation of the catalyst layer occurs. Accordingly, $\alpha$-$Al_2O_3$, which is resistant to heat and changes little at high temperature, is desirable as the inorganic particles.

The catalyst layer of the exhaust gas purifying catalyst of the present invention preferably contains, in addition to the aforementioned roughening material, a carrier supporting noble metal as the catalytic component. Moreover, a weight ratio of the carrier supporting noble metal to the roughening material is preferably in a range from 98/2 to 60/40. When the roughening material is contained in the catalyst layer, the content of the catalytic component is reduced as much as the contained roughening material, and the activity of the catalyst is therefore reduced. Accordingly, the content of the roughening material is suitably 40 wt % or less in the catalyst layer. Moreover, if the catalyst layer contains less than 2 wt % of the roughening material, it is difficult to roughen the surface of the catalyst layer. More preferably, the content of the roughening material is 5 wt % or more.

The average particle size of the carrier is preferably not less than 2 μm and not more than 6 μm. This can effectively roughen the surface of the catalyst layer. When the average particle size of the carrier is less than 2 μm, the carrier covers the roughening material, so that desired roughness is not formed. Moreover, when the average particle size of the carrier exceeds 6 μm, adhesion between the carrier and the roughening material is reduced, which may cause exfoliation of the carrier.

In the exhaust gas purifying catalyst according to the embodiment of the present invention, preferably, noble metal in the catalyst layer is one selected from Pt, Pd, and Rh. This noble metal is supported on the carrier which is composed of oxide of at least one or more types of metal selected from aluminum, cerium, zirconium, and lanthanum. Preferably, the noble metal is not supported on the roughening material but supported on the carrier. When the noble metal is configured to be supported on the roughening material of the inorganic fibers, sintering of noble metal directly attached to the fibers immediately occurs because the inorganic fibers have a lower specific surface area. On the other hand, the catalyst layer of the exhaust gas purifying catalyst of the embodiment individually contains the carrier supporting noble metal and the roughening material (fibers), so that the surface of the catalyst layer can be roughened and the sintering of noble metal can be suppressed.

The exhaust gas purifying catalyst of the present invention may contain as a promoter ceria having oxygen storage capacity, alkali metal and alkali-earth metal to improve the heat resistance, and zeolite having HC adsorption capacity.

The exhaust gas purifying catalyst containing the aforementioned roughening material can be prepared as follows. First, powder of the carrier composed of the oxide supporting noble metal is produced. Thereafter, this powder of the carrier and the roughening material are mixed to form slurry. The slurry is then applied to the wall of the substrate, followed by drying and baking to form the catalyst layer.

Hereinafter, the present invention is described in detail with Examples and Comparative Examples. However, the present invention is not limited to these Examples.

EXAMPLE 1

In order to manufacture the exhaust gas purifying catalyst of Example 1, a slurry for a first catalyst layer (a bottom layer) formed in contact with the wall of the substrate was produced. The process in which the slurry for the first catalyst layer was produced was as follows. First, a cerium acetate aqueous solution was supported on γ-alumina with a specific surface area of about 200 $m^2$/g so that the support concentration was 12 wt % in terms of $CeO_2$. The resultant was dried at 120° C. for 1 day and baked at 400° C. for one hour. The carrier powder obtained by baking was made to support a tetraammineplatinum hydroxide solution so that the platinum support concentration was 0.3 wt % in terms of Pt. The resultant was dried at 120° C. for 1 day and baked at 400° C. for 1 hour, thus obtaining catalyst powder A. 166.5 g of the catalyst powder A, 52.8 g of cerium oxide powder, 9.8 g of γ-alumina powder, 21 g of alumina sol, 240 g of water, and 10 g of nitric acid were put into a magnetic ball mill to be mixed and ground, thus obtaining catalyst slurry A. The average particle size (D50) of the catalyst slurry A was 3 μm.

Next, a slurry for a second catalyst layer (a top layer) formed on the first catalyst layer was produced. The process in which the slurry for the second catalyst layer was produced was as follows. First, a rhodium nitrate aqueous solution was supported on $ZrO_2$ with a specific surface area of about 50 $m^2$/g so that the support concentration was 0.5 wt % in terms of Rh. The obtained liquid was dried at 120° C. for 1 day and baked at 400° C. for 1 hour, thus obtaining catalyst powder B. 29.5 g of the catalyst powder B, 58.8 g of the catalyst powder A, 58.8 g of cerium oxide powder, 14.8 g of alumina sol, 150 g of water, and 10 g of nitric acid were put into a magnetic ball mill to be mixed and ground, thus obtaining a catalyst slurry B. The average particle size (D50) of the catalyst slurry B was 3 μm. 88.3 g of alumina fibers (α-alumina fibers, fiber diameter: 5 μm) as the roughening material was then dispersed in 90 g of water and stirred. The obtained liquid was then put into the catalyst slurry B and further stirred, thus obtaining a catalyst slurry C.

Next, the slurry (catalyst slurry A) for the first catalyst layer and the slurry (catalyst slurry C) for the second catalyst layer were applied to the substrate to produce the first and second catalyst layers. The process in which the first and second catalyst layers were produced was as follows. First, the catalyst slurry A was coated onto a cordierite monolith substrate (0.12 L, 400 cells) and had redundant slurry in the cells removed by airflow. The catalyst slurry A was dried at 130° C. and then baked at 400° C. for 1 hour, thus obtaining the first catalyst layer with a coating weight of 95 g/L.

Next, the catalyst slurry C was coated onto the first catalyst layer and had redundant slurry in the cells removed by airflow. The catalyst slurry C was dried at 130° C. and then baked at 400° C. for 1 hour, thus obtaining the second catalyst layer with a coating weight of 85 g/L.

Figure 2A:
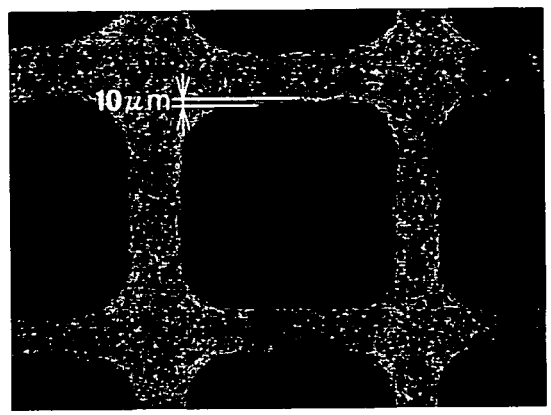
FIGS. 2A to 2C are micrographs of a catalyst of Example 1 observed.
Figure 2B:
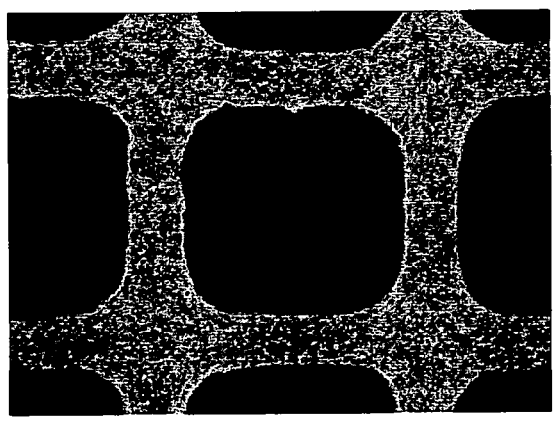
Figure 2C:
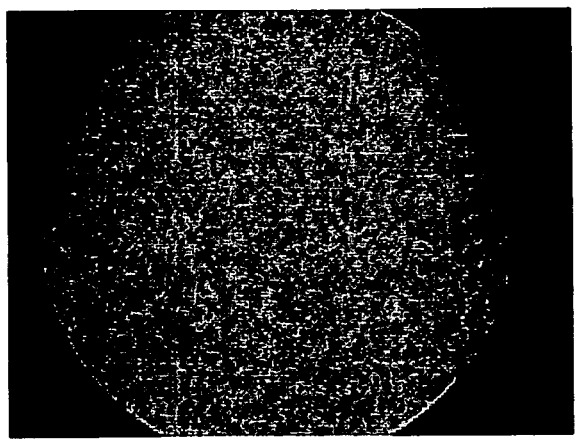

The catalyst manufactured through the aforementioned processes was observed with a microscope. FIGS. 2A to 2C are micrographs of cross sections of the catalyst of Example 1 observed. FIGS. 2A and 2B were views of cross sections perpendicular to the longitudinal direction of the through-holes, and FIG. 2C is a view of a cross section parallel to the longitudinal direction. As is apparent from FIGS. 2A to 2C, the surface of the second catalyst layer which corresponds to the top layer of the catalyst of the present invention was roughened, and the maximum height of profile (Rz) was 10 to 20 μm.

COMPARATIVE EXAMPLE 1

Comparative Example 1 is the same as Example 1 except that the second catalyst layer did not contain the roughening material. The process in which the slurry for the second catalyst layer (top layer) was produced to form the second catalyst layer which did not contain the roughening material was as follows. 29.5 g of the catalyst powder B, 58.8 g of the catalyst powder A, 58.8 g of cerium oxide powder, 88.3 g of γ-alumina, 14.8 g of alumina sol, 240 g of water, and 10 g of nitric acid were put into a magnetic ball mill to be mixed and ground, thus obtaining a catalyst slurry D. The average particle size of the catalyst slurry D was 3 μm.

Next, the slurry (catalyst slurry A) for the first catalyst layer and the slurry (catalyst slurry D) for the second catalyst layer were applied to the substrate to produce the first and second catalyst layers. The process in which the first and second catalyst layers were produced is as follows. First, the catalyst slurry A was coated onto a cordierite monolith substrate (0.12 L, 400 cells), which is the same as the substrate of Example 1, and had redundant slurry in the cells removed by airflow. The catalyst slurry A was dried at 130° C. and then baked at 400° C. for 1 hour, thus obtaining the second catalyst layer with a coating weight of 95 g/L.

Next, the catalyst slurry D was coated onto the first catalyst layer and had redundant slurry in the cells removed by airflow. The slurry D was dried at 130° C. and then baked at 400° C. for 1 hour, thus obtaining a catalyst layer with a coating weight of 85 g/L.

Figure 3A:
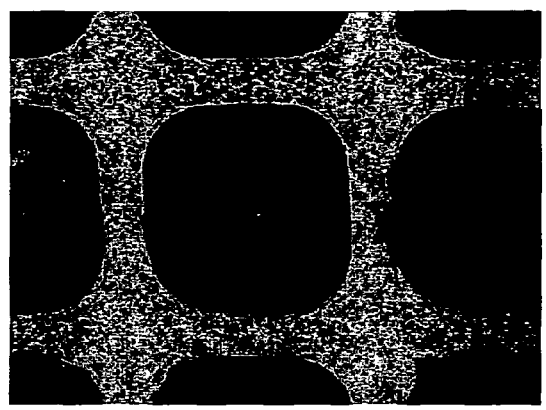
FIGS. 3A to 3C are micrographs of a catalyst of Comparative Example 1 observed.
Figure 3B:
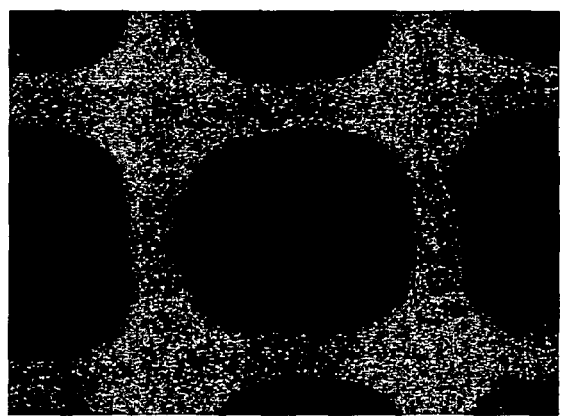
Figure 3C:
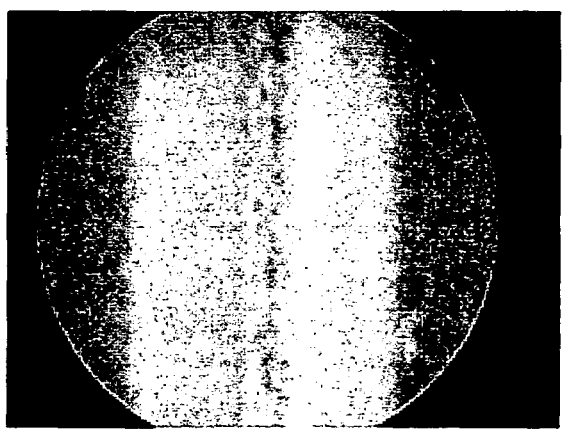

The catalyst manufactured through the aforementioned processes was observed with a microscope. FIGS. 3A to 3C are micrographs of cross sections of the catalyst of Comparative Example 1 observed. FIGS. 3A and 3B are views of cross sections perpendicular to the longitudinal direction of the through-holes, and FIG. 3C is a view of a cross section parallel to the longitudinal direction. As apparent from FIGS. 3A to 3C, the surface of the second catalyst layer which corresponds to the top layer of the catalyst of the present invention was smooth, and the maximum height of profile (Rz) was less than 2 μm.

Next, the exhaust gas purifying catalysts of Example 1 and Comparative Example 1 were subjected to a durability test. In this durability test, the catalysts were attached to an exhaust system of a 3500-cc gasoline engine, and the gasoline engine was operated for 30 hours with a catalyst inlet temperature of 900° C.

The performance evaluation of the catalyst was performed by measuring a conversion rate. Specifically, the catalysts were attached to the exhaust system of the 3500-cc gasoline engine, and the catalyst inlet temperature was being raised from 150° C. to 500° C. at 10° C./min. Densities of the components of HC, CO, and $NO_x$ in the exhaust gas at the inlet and outlet of the catalyst were measured while the temperature was being raised, and the conversion rates of the components were calculated by the following equations.

HC conversion rate(%)=[(catalyst inlet HC concentration)−(catalyst outlet HC concentration)]/(catalyst inlet HC concentration)×100

CO conversion rate(%)=[(catalyst inlet CO concentration)−(catalyst outlet CO concentration)]/(catalyst inlet CO concentration)×100

$NO_x$ conversion rate(%)=[(catalyst inlet $NO_x$ concentration)−(catalyst outlet $NO_x$ concentration)]/(catalyst inlet $NO_x$ concentration)×100

Figure 4:
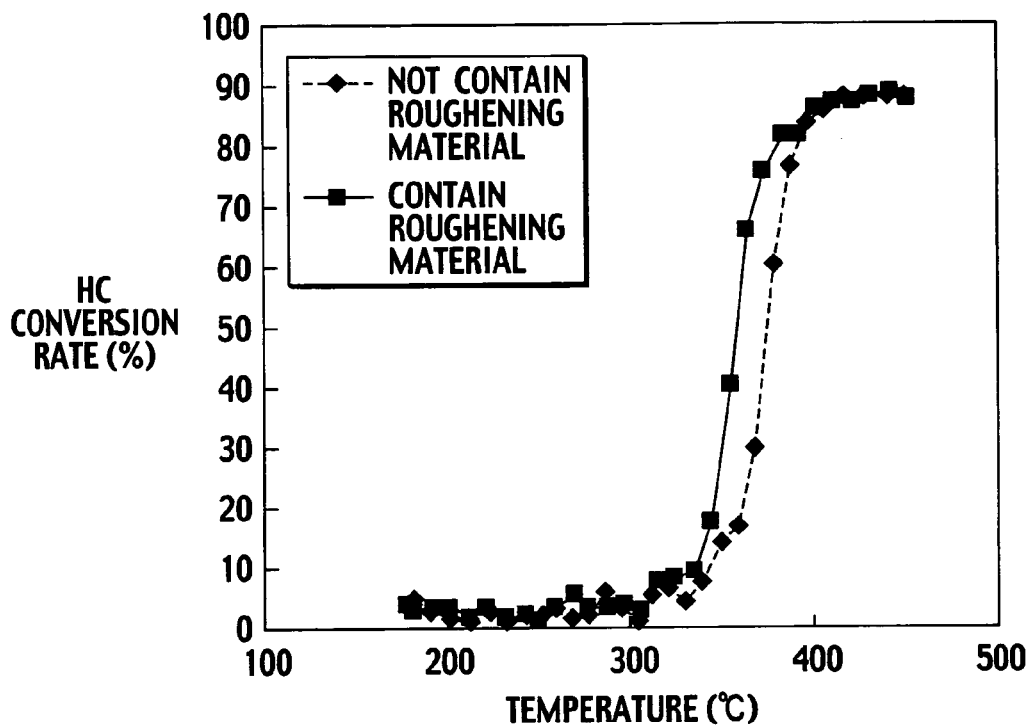
FIG. 4 is a graph showing a relation between catalyst inlet temperature and an HC conversion rate.
Figure 5:
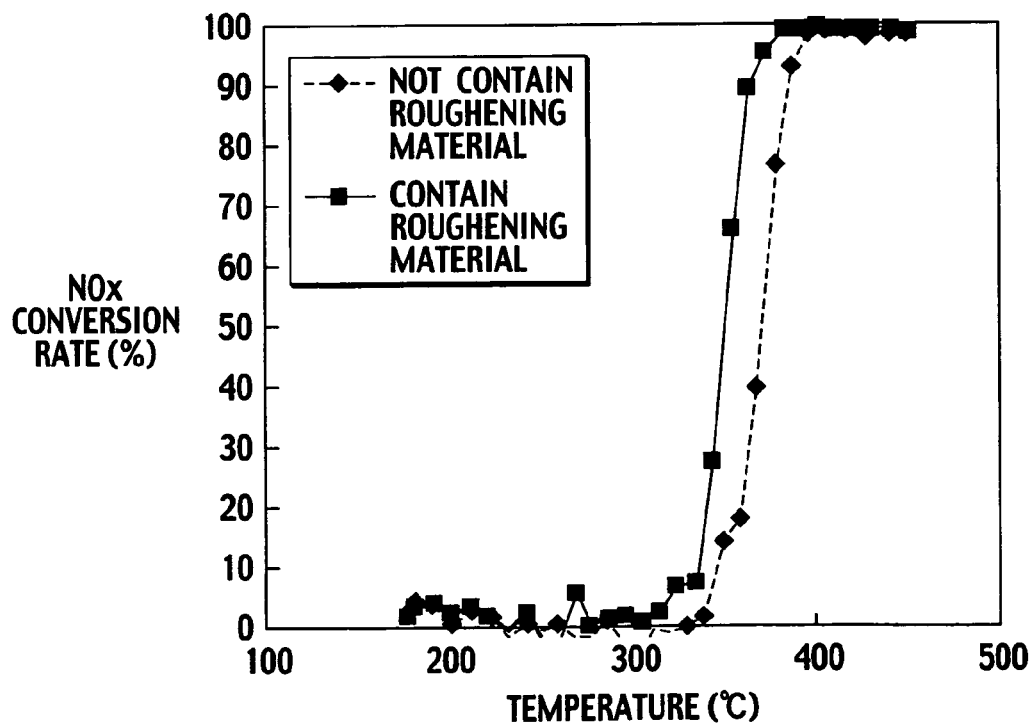
FIG. 5 is a graph showing a relation between the catalyst inlet temperature and a $NO_x$ conversion rate.

FIGS. 4 and 5 were graphs showing relations between the catalyst inlet temperature and the HC conversion rate and $NO_x$ conversion rate of the exhaust gas purifying catalyst of Example 1 and Comparative Example 1, respectively. Based on such data, temperature when each conversion rate was 50% is indicated by T50. Temperatures at 50% conversion rate of the exhaust gas purifying catalyst of Example 1 and Comparative Example 1 are shown in Table 1.

TABLE 1

| | Maximum Height of Profile | Temperature at 50% Conversion Rate (T50) | |
|---|---|---|---|
| | (μm) | HC (° C.) | $NO_x$ (° C.) |
| Example 1 | 10-20 | 359 | 351 |
| Comparative Example 1 | less than 2 | 374 | 370 |

As is apparent from Table 1, the catalyst of Example 1, which had roughness with a maximum height of profile (Rz) of 10 to 20 μm in the catalyst surface of the top layer, had T50 for the HC and $NO_x$ conversion rates lower than those of the Comparative Example 1, respectively, and provided excellent purification performance.

Figure 6:
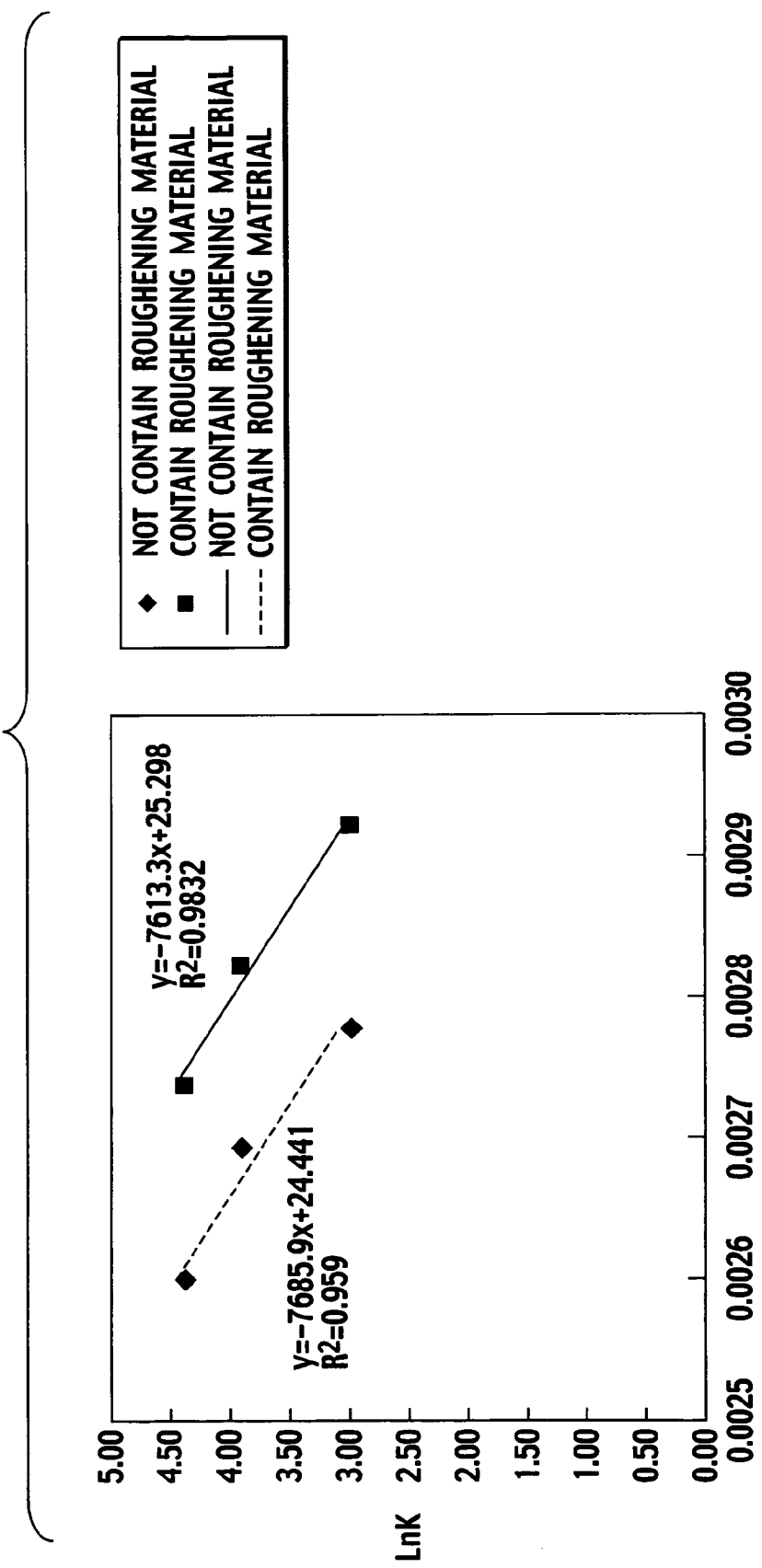
FIG. 6 is a graph showing a relation between a natural logarithm of a conversion rate K of the catalyst and a reciprocal of temperature.

FIG. 6 shows a graph representing a relation between a natural logarithm of a conversion rate K of the entire catalyst and a reciprocal of temperature. Herein, the conversion rate K is a value obtained by integrating the HC, CO, and $NO_x$ conversion rates of Example 1 and Comparative Example 1. From the result of FIG. 6, Example 1, which contained the roughening material, could have an effect on the frequency of contact between the catalyst and exhaust gas about twice as much as Comparative Example 1.

EXAMPLE 2

Example 2 was the same as Example 1 except that the fiber diameter of α-alumina fibers in the catalyst slurry C was 3 μm.

EXAMPLE 3

Example 3 was the same as Example 1 except that the fiber diameter of α-alumina fibers in the catalyst slurry C was 6 μm and the average particle sizes of the slurries A and C were 5 μm. The average particle sizes were adjusted by changing the grinding time to 30 minutes (the grinding time of the slurry with an average particle size of 3 μm of Example 1 is 150 min.). Alumina balls used in grinding had a diameter of 5 mm, which was the same as that of Example 1.

EXAMPLE 4

Example 4 was the same as Example 1 except that the fiber diameter of α-alumina fibers in the catalyst slurry C was 7 μm and the average particle sizes of the slurries A and C were 5 μm.

COMPARATIVE EXAMPLE 2

Comparative Example 2 was the same as Example 1 except that the fiber diameter of α-alumina fibers in the catalyst slurry C was 1 μm.

For Examples 1 to 4 and Comparative Example 2, results of examination of the temperature (T50) when the HC conversion rate was 50% are shown in Table 2.

TABLE 2

|  | Maximum Height of Profile (μm) | Fiber Diameter (μm) | Catalyst Powder Average particle size (μm) | Temperature at 50% HC Conversion (° C.) |
|---|---|---|---|---|
| Example 1 | 10-20 | 5 | 3 | 359 |
| Example 2 | 3-10 | 3 | 3 | 362 |
| Example 3 | 10-30 | 6 | 5 | 357 |
| Example 4 | 20-50 | 7 | 5 | 355 |
| Comparative Example 2 | Less than 2 | 1 | 3 | 373 |

As is apparent from Table 2, Examples 1 to 4 had low T50 and had excellent purification performance. On the other hand, as for Comparative Example 2, T50 was higher than that of Examples 1 to 4 because the fiber diameter of the roughening material was small and the maximum height of profile (Rz) was less than 2 μm.

EXAMPLE 5

Example 5 is an example in which the roughening material was the inorganic particles. The process in which a slurry for the second catalyst layer (top layer) was produced to form the second catalyst layer which contained the inorganic particles is as follows. First, a rhodium nitrate aqueous solution was supported on $ZrO_2$ with a specific surface area of about 50 $m^2/g$ so that the support concentration was 0.5 wt % in terms of Rh. The obtained solution was dried at 120° C. for 1 day and baked at 400° C. for 1 hour, thus obtaining catalyst powder B. 29.5 g of the catalyst powder B, 58.8 g of the catalyst powder A, 58.8 g of cerium oxide powder, 14.8 g of alumina sol, 150 g of water, and 10 g of nitric acid were put into a magnetic ball mill to be mixed and ground, thus obtaining a catalyst slurry B. The average particle size (D50) of the catalyst slurry B was 3 μm. Separately from the catalyst slurry B, 88.3 g of γ-alumina and 90 g of water were put into a magnetic ball mill and mixed and ground to obtain a slurry E as the roughening material. The average particle size of the slurry E was 6 μm. Subsequently, the catalyst slurry B and slurry E were mixed to obtain a catalyst slurry F.

Next, the slurry (catalyst slurry A) for the first catalyst layer and the slurry (catalyst slurry F) for the second catalyst layer were coated onto the substrate to produce the first and second catalyst layers. The process in which the first and second catalyst layers were produced was as follows. First, the catalyst slurry A was coated onto a cordierite monolith substrate (0.12 L, 400 cells) and had redundant slurry in the cells removed by airflow. The catalyst slurry A was dried at 130° C. and then baked at 400° C. for 1 hour, thus obtaining the first catalyst layer with a coating weight of 95 g/L.

Next, the catalyst slurry F was coated onto the first catalyst layer and had redundant slurry in the cells removed by airflow. The slurry F was dried at 130° C. and then baked at 400° C. for 1 hour, thus obtaining the second catalyst layer with a coating weight of 85 g/L.

The catalyst manufactured through the aforementioned processes was cut at a cell cross section and observed with a microscope. The observation revealed that the surface of the second catalyst layer was roughened and the maximum height of profile (Rz) was 10 to 20 μm.

EXAMPLE 6

Example 6 was the same as Example 5 except that the average particle size of the slurry E was 8 μm.

COMPARATIVE EXAMPLE 3

Comparative Example 3 was the same as Example 5 except that the average particle size of the slurry E was 4 μm.

For Examples 5 and 6 and Comparative Example 3, results of examination of the temperature (T50) when the HC conversion rate was 50% are shown in Table 3.

TABLE 3

|  | Maximum Height of Profile (μm) | Roughening material particle size (μm) | Catalyst Powder Average particle size (μm) | Temperature at 50% HC Conversion (° C.) |
|---|---|---|---|---|
| Example 5 | 5-20 | 6 | 3 | 358 |
| Example 6 | 10-25 | 8 | 3 | 356 |
| Comparative Example 3 | less than 2 | 4 | 3 | 375 |

As is apparent from Table 3, Examples 5 and 6 had low T50 and included excellent purification performance. On the other hand, T50 of Comparative Example is higher than that of Examples 5 and 6 because the particle size of γ-alumina as the roughening material was smaller than twice the particles size of the carrier supporting noble metal.

EXAMPLE 7

Examples 7 to 10 and Comparative Example 4 described below are examples having different values of a thickness ratio of the second catalyst layer (top layer) to the first catalyst layer (bottom layer).

In order to manufacture the exhaust gas purifying catalyst of Example 7, first, a slurry for the first catalyst layer (bottom layer) formed in contact with the wall of the substrate was produced. The process in which the slurry for the first catalyst layer was produced was as follows. 166.4 g of the catalyst powder A, 52.8 g of cerium oxide powder, 9.8 g of γ-alumina powder, 21 g of alumina sol, 240 g of water, and 10 g of nitric acid were put into a magnetic ball mill to be mixed and ground, thus obtaining a catalyst slurry A. The average particle size of the catalyst slurry A was 3 μm.

Next, a slurry for the second catalyst layer (top layer) applied on the first catalyst layer was produced. The process in which the slurry for the second catalyst layer was produced was as follows. 58.8 g of the catalyst powder A, 88.2 g of γ-alumina, 14.8 g of alumina sol, 150 g of water, and 10 g of nitric acid were put into a magnetic ball mill to be mixed and ground, thus obtaining a catalyst slurry B. The average particle size of the catalyst slurry B was 3 μm. Separately from the catalyst slurry B, 88.2 g of alumina fibers (α-alumina fibers, fiber diameter: 5 μm) as the roughening material was then dispersed in 90 g of water and stirred. The obtained liquid was then put into the catalyst slurry B and further stirred, thus obtaining a catalyst slurry C.

Next, the slurry (catalyst slurry A) for the first catalyst layer and the slurry (catalyst slurry C) for the second catalyst layer were applied to the substrate to produce the first and second catalyst layers. The process in which the first and second catalyst layers were produced was as follows. First, the catalyst slurry A was coated onto a cordierite monolith substrate (0.12 L, 400 cells) and had redundant slurry in the cells removed by airflow. The catalyst slurry A was dried at 130° C. and then baked at 400° C. for 1 hour, thus obtaining the first catalyst layer with a coating weight of 80 g/L.

Next, the catalyst slurry C was coated onto the first catalyst layer and had redundant slurry removed by airflow. The catalyst slurry C was dried at 130° C. and then baked at 400° C. for 1 hour, thus obtaining the second catalyst layer with a coating weight of 80 g/L.

EXAMPLE 8

The process in which a catalyst slurry A was produced as a slurry for the first catalyst layer was as follows. 130.6 g of the catalyst powder A, 52.8 g of cerium oxide powder, 45.6 g of γ-alumina powder, 21 g of alumina sol, 240 g of water, and 10 g of nitric acid were put into a magnetic ball mill to be mixed and ground, thus obtaining the catalyst slurry A. The average particle size of the catalyst slurry A was 3 μm.

A slurry for the second catalyst layer applied to the first catalyst layer was the same as the catalyst slurry C of Example 7.

The catalyst slurry A was coated onto a cordierite monolith substrate (0.12 L, 400 cells) and had redundant slurry in the cells removed by airflow. The catalyst slurry A was dried at 130° C. and then baked at 400° C. for 1 hour, thus obtaining the first catalyst layer with a coating weight of 120 g/L.

Next, the catalyst slurry C was coated onto the first catalyst layer and had redundant slurry in the cells removed by airflow. The slurry C was dried at 130° C. and then baked at 400° C. for 1 hour, thus obtaining the second catalyst layer with a coating weight of 40 g/L.

EXAMPLE 9

The process in which a catalyst slurry A was produced as a catalyst slurry for the first catalyst layer was as follows. 116.2 g of the catalyst powder A, 52.8 g of cerium oxide powder, 60.0 g of γ-alumina powder, 21 g of alumina sol, 240 g of water, and 10 g of nitric acid were put into a magnetic ball mill to be mixed and ground, thus obtaining a catalyst slurry A. The average particle size of the catalyst slurry A was 3 μm.

A slurry for the second catalyst layer applied to the first catalyst layer was the same as the catalyst layer C of Example 7.

The catalyst slurry A was coated onto a cordierite monolith substrate (0.12 L, 400 cells) and had redundant slurry in the cells removed by airflow. The slurry A was dried at 130° C. and then baked at 400° C. for 1 hour, thus obtaining the first catalyst layer with a coating weight of 150 g/L.

Next, the catalyst slurry C was coated onto the first catalyst layer and had redundant slurry in the cells removed by airflow. The slurry C was dried at 130° C. and then baked at 400° C. for 1 hour, thus obtaining the second catalyst layer with a coating weight of 10 g/L.

EXAMPLE 10

As a slurry for the first catalyst layer, a catalyst slurry A was produced. The process in which the catalyst slurry A was produced was as follows. 114.3 g of the catalyst powder A, 52.8 g of cerium oxide powder, 61.9 g of γ-alumina powder, 21 g of alumina sol, 240 g of water, and 10 g of nitric acid were put into a magnetic ball mill to be mixed and ground, thus obtaining the catalyst slurry A. The average particle size of the catalyst slurry A was 3 μm.

A slurry for the second catalyst layer applied to the first catalyst layer was the same as the catalyst slurry C of Example 7.

The catalyst slurry A was coated onto a cordierite monolith substrate (0.12 L, 400 cells) and had redundant slurry in the cells removed by airflow. The slurry A was dried at 130° C. and then baked at 400° C. for 1 hour, thus obtaining the first catalyst layer with a coating weight of 155 g/L.

Next, the catalyst slurry C was attached to the first catalyst layer and had redundant slurry in the cells removed by airflow. The slurry C was dried at 130° C. and then baked at 400° C. for 1 hour, thus obtaining the second catalyst layer with a coating weight of 5 g/L.

COMPARATIVE EXAMPLE 4

A slurry to form a first catalyst layer was the same as the catalyst slurry A of Example 7. A slurry for the second catalyst layer applied on the first catalyst layer was produced. The process in which the above slurry was produced was as follows. 58.8 g of the catalyst powder A, 176.4 g of γ-alumina powder, 14.8 g of alumina sol, 240 g of water, and 10 g of nitric acid were put into a magnetic ball mill to be mixed and ground, thus obtaining a catalyst slurry B. The average particle size of the catalyst slurry B was 3 μm.

The catalyst slurry A was coated onto a cordierite monolith substrate (0.12 L, 400 cells) and had redundant slurry in the cells removed by airflow. The catalyst slurry A was dried at 130° C. and then baked at 400° C. for 1 hour, thus obtaining the first catalyst layer with a coating weight of 80 g/L.

Next, the catalyst slurry B was coated onto the first catalyst layer and had redundant slurry in the cells removed by airflow. The catalyst slurry B was dried at 130° C. and then baked at 400° C. for 1 hour, thus obtaining the second catalyst layer with a coating weight of 80 g/L.

For Examples 7 to 10 and Comparative Example 4, results of examination of the temperature (T50) when the HC conversion rate was 50% are shown in Table 4 together with coating weight of the catalyst layers. The ratio shown in Table 4 in coating weight of the first catalyst layer to the second catalyst layer can be considered to be the same as thickness ratio of the first catalyst layer to the second catalyst layer.

TABLE 4

|  | Maximum Height of Profile (μm) | First catalyst layer (g/L) | Second catalyst layer (g/L) | First catalyst layer/Second catalyst layer | Temperature at 50% HC Conversion Rate (° C.) |
| --- | --- | --- | --- | --- | --- |
| Example 7 | 5-20 | 80 | 80 | 50/50 | 373 |
| Example 8 | 5-20 | 120 | 40 | 75/25 | 375 |
| Example 9 | 5-15 | 150 | 10 | 94/6 | 378 |
| Example 10 | 5-15 | 155 | 5 | 97/3 | 391 |
| Comparative Example 4 | less than 2 | 80 | 80 | 50/50 | 406 |

As is apparent from Table 4, in Examples 7 to 10, the thickness of the second catalyst layer containing the roughening material is not more than half of the sum of the thicknesses of the first and second catalyst layers, and the surface of the second catalyst layer was surely roughened. Therefore, Examples 7 to 10 had low T50 and provided excellent purification performance. Especially Examples 7 to 9 provided more excellent purification performance than Example 10 because Examples 7 to 9 had a thickness ratio of the first catalyst layer to the second catalyst layer of not more than 95/5. On the other hand, Comparative Example 4 did not contain the roughening material in the second catalyst layer. Accordingly, the surface of the second catalyst layer thereof was smooth, and T50 thereof was higher than that of Examples 7 to 10.

EXAMPLE 11

Example 11 was the same as Example 1 except that α-alumina fibers of Example 1 were replaced with a mixture of α-alumina fibers and γ-alumina fibers with a weight ratio of 80/20.

EXAMPLE 12

Example 12 was the same as Example 1 except that α-alumina fibers of Example 1 were replaced with a mixture of α-alumina fibers and γ-alumina fibers with a weight ratio of 75/25.

EXAMPLE 13

Example 13 was the same as Example 1 except that all α-alumina fibers of Example 1 were replaced with γ-alumina fibers.

For Examples 1 and 11 to 13, results of examination of the temperature (T50) when the HC conversion rate was 50% are shown in Table 5.

TABLE 5

| | Maximum Height of Profile (μm) | α-alumina/ γ-alumina | Temperature at 50% HC Conversion Rate (° C.) |
|---|---|---|---|
| Example 1 | 10-20 | 100/0 | 359 |
| Example 11 | 10-20 | 80/20 | 359 |
| Example 12 | 10-20 | 75/25 | 367 |
| Example 13 | 10-20 | 0/100 | 377 |

As is apparent from Table 5, in the Examples 1 and 11 to 13, roughness with a maximum height of profile was 10 to 20 μm was formed in the surface of the second catalyst layer because the second catalyst layer contained the roughening material. Accordingly, the Examples 1 and 11 to 13 had low T50 and provided excellent purification performance. In Examples 1 and 11 among these Examples, the roughening material was resistant to heat because the roughening material thereof contained 80 wt % or more of α-alumina. Accordingly, Examples 1 and 11 provided more excellent purification performance without causing exfoliation of the catalyst layer.

EXAMPLE 14

Examples 14 to 17 described below were examples in each of which the second catalyst layer contained a different type of the particle-shaped roughening material. Example 14 was the same as Example 5 except that γ-alumina contained as the roughening material in Example 5 was replaced with α-alumina.

EXAMPLE 15

Example 15 was the same as Example 5 except that the roughening material of Example 5 was replaced with ceria ($CeO_2$).

EXAMPLE 16

Example 16 was the same as Example 5 except that the roughening material of Example 5 was replaced with zirconia ($ZrO_2$).

EXAMPLE 17

Example 16 was the same as Example 5 except that the roughening material of Example 5 was replaced with titania ($TiO_2$).

For Examples 5 and 14 to 17, results of examination of the temperature (T50) when the HC conversion rate was 50% are shown in Table 6.

TABLE 6

| | Maximum Height of Profile (μm) | Roughening material | Roughening material Particle size (μm) | Catalyst Powder Average particle size (μm) | Temperature at 50% HC Conversion (° C.) |
|---|---|---|---|---|---|
| Example 5 | 5-20 | γ-Alumina | 6 | 3 | 358 |
| Example 14 | 5-20 | α-Alumina | 6 | 3 | 355 |
| Example 15 | 5-20 | Ceria | 6 | 3 | 351 |
| Example 16 | 5-20 | Zirconia | 6 | 3 | 357 |
| Example 17 | 5-20 | Titania | 6 | 3 | 358 |

As is apparent from Table 6, in Examples 5 and 14 to 17, roughness with a maximum height of profile of 10 to 20 μm was formed in the surface of the second catalyst layer because the particle-shaped roughening material whose particle size was twice the particle size of the catalyst powder was contained in the second catalyst layer. Examples 5 and 14 to 17 had therefore low T50 and provided excellent purification performance. Among these Examples, Example 15, which contained ceria having an oxygen storage capacity as the roughening material, had higher catalyst activity than that of the other Examples, providing more excellent purification performance.

EXAMPLE 18

Examples 18 and 19 described below were examples in each of which the catalyst powder particles in the second catalyst layer had a different particle size. Example 18 was the same as Example 1 except that the average particle sizes of the catalyst slurries A and B were 6 μm.

EXAMPLE 19

Example 19 was the same as Example 1 except that the average particle sizes of the catalyst slurries A and B were 7 μm.

For Examples 1, 18, and 19, results of examination of the temperature (T50) when the HC conversion rate was 50% are shown in Table 7. The average particle size of the catalyst slurry can be considered to be the same as the particle size of the carrier supporting noble metal.

TABLE 7

|  | Maximum Height of Profile (μm) | Catalyst Powder Average particle size (μm) | Temperature at 50% HC Conversion Rate (° C.) |
|---|---|---|---|
| Example 1 | 5-20 | 3 | 359 |
| Example 18 | 5-20 | 6 | 357 |
| Example 19 | 5-20 | 7 | 372 |

As is apparent from Table 7, Examples 1, 18, and 19 all had excellent purification performance. Especially Examples 1 and 18, in each of which the particle size of the carrier supporting noble metal was not more than 6 μm, provided more excellent purification performance.

EXAMPLE 20

Examples 20 and 21 and Comparative Examples 5 to 7 described below are examples having different values of the weight ratio of the carrier supporting noble metal to the roughening material.

In order to manufacture an exhaust gas purifying catalyst of Example 20, first, a slurry for the first catalyst layer (bottom layer) was produced. The process in which the slurry for the first catalyst layer was produced was as follows. 166.4 g of the catalyst powder A, 52.8 g of cerium oxide powder, 9.8 g of γ-alumina powder, 21 g of alumina sol, 240 g of water, and 10 g of nitric acid were put into a magnetic ball mill to be mixed and ground, thus obtaining a catalyst slurry A. The average particle size of the catalyst slurry A was 3 μm.

Next, a slurry for the second catalyst layer (top layer) formed on the first catalyst layer was produced. The process in which the slurry for the second catalyst layer was produced was as follows. 58.8 g of the catalyst powder A, 14.8 g of alumina sol, 100 g of water, and 10 g of nitric acid were put into a magnetic ball mill to be mixed and ground, thus obtaining a catalyst slurry B. The average particle size of the catalyst slurry B was 3 μm.

Separately from the catalyst slurry B, 176.4 g of alumina fibers (α-alumina fibers, fiber diameter: 5 μm) as the roughening material was dispersed in 140 g of water and stirred. The obtained liquid was then put into the catalyst slurry B and further stirred, thus obtaining a catalyst slurry C.

Next, the slurry (catalyst slurry A) for the first catalyst layer and the slurry (catalyst slurry C) for the second catalyst layer were applied to the substrate to produce the first and second catalyst layers. The process in which the first and second catalyst layers were produced was as follows. First, the catalyst slurry A was coated onto a cordierite monolith substrate (0.12 L, 400 cells) and had redundant slurry in the cells removed by airflow. The catalyst slurry A was dried at 130° C. and then baked at 400° C. for 1 hour, thus obtaining the first catalyst layer with a coating weight of 80 g/L.

Next, the catalyst slurry C was coated onto the first catalyst layer and had redundant slurry in the cells removed by airflow. The catalyst slurry C was dried at 130° C. and then baked at 400° C. for 1 hour, thus obtaining the second catalyst layer with a coating weight of 80 g/L.

EXAMPLE 21

In order to manufacture the exhaust gas purifying catalyst of Example 21, first, a slurry for the first catalyst layer (bottom layer) was produced. The process in which the slurry for the first catalyst layer was produced was as follows. 166.4 g of the catalyst powder A, 52.8 g of cerium oxide powder, 9.8 g of γ-alumina powder, 21 g of alumina sol, 240 g of water, and 10 g of nitric acid were put into a magnetic ball mill to be mixed and ground, thus obtaining a catalyst slurry A. The average particle size of the catalyst slurry A was 3 μm.

Next, a slurry for the second catalyst layer applied to the first catalyst layer was produced. The process in which the slurry for the second catalyst layer was produced was as follows. 58.8 g of the catalyst powder A, 161.4 g of γ-alumina, 14.8 g of alumina sol, 190 g of water, and 10 g of nitric acid were put into a magnetic ball mill to be mixed and ground, thus obtaining a catalyst slurry B. The average particle size of the catalyst slurry B was 3 μm.

Separately from the catalyst slurry B, 15 g of alumina fibers (α-alumina fibers, fiber diameter: 5 μm) as the roughening material was dispersed in 50 g of water and stirred. The obtained liquid was then put into the catalyst slurry B and further stirred, thus obtaining a catalyst slurry C.

Next, the slurry (catalyst slurry A) for the first catalyst layer and the slurry (catalyst slurry C) for the second catalyst layer were applied to the substrate to produce the first and second catalyst layers. The process in which the first and second catalyst layers were produced was as follows. First, the catalyst slurry A was coated onto a cordierite monolith substrate (0.12 L, 400 cells) and had redundant slurry in the cells removed by airflow. The catalyst slurry A was dried at 130° C. and then baked at 400° C. for 1 hour, thus obtaining the first catalyst layer with a coating weight of 80 g/L.

Next, the catalyst slurry C was coated onto the first catalyst layer and had redundant slurry in the cells removed by airflow. The slurry C was dried at 130° C. and then baked at 400° C. for 1 hour, thus obtaining the second catalyst layer with a coating weight of 80 g/L.

COMPARATIVE EXAMPLE 5

In order to manufacture an exhaust gas purifying catalyst of Comparative Example 5, first, a slurry for the first catalyst layer (bottom layer) formed in contact with the wall of the substrate was produced. The process in which the slurry for the first catalyst layer was produced was as follows. 166.4 g of the catalyst powder A, 52.8 g of cerium oxide powder, 9.8 g of γ-alumina powder, 21 g of alumina sol, 240 g of water, and 10 g of nitric acid were put into a magnetic ball mill to be mixed and ground, thus obtaining a catalyst slurry A. The average particle size of the catalyst slurry A was 3 μm.

Next, a slurry for the second catalyst layer (top layer) applied to the first catalyst layer was produced. The process in which the slurry for the second catalyst layer was produced was as follows. A cerium acetate aqueous solution was supported on γ-alumina with a specific surface area of about 200 m²/g so that the support concentration was 12 wt % in terms of $CeO_2$. The obtained liquid was dried at 120° C. for 1 day and baked at 400° C. for 1 hour. The carrier powder thus obtained by baking was made to support a tetraammineplatinum hydroxide solution so that the platinum support concentration was 1.0 wt % in terms of Pt. The obtained liquid was dried at 120° C. for 1 day and baked at 400° C. for 1 hour, thus obtaining catalyst powder C. 17.6 g of the catalyst powder C, 14.8 g of alumina sol, 50 g of water, and 10 g of nitric acid were put into a magnetic ball mill to be mixed and ground, thus obtaining a catalyst slurry B. The average particle size of the catalyst slurry B was 3 µm. 210 g of alumina fibers (α-alumina fibers, fiber diameter: 5 µm) as the roughening material was dispersed in 200 g of water and stirred. The obtained liquid was then put into the catalyst slurry B and further stirred, thus obtaining a catalyst slurry C.

Next, the slurry (catalyst slurry A) for the first catalyst layer and the slurry (catalyst slurry C) for the second catalyst layer were applied to the substrate to produce the first and second catalyst layers. The process in which the first and second catalyst layers were produced was as follows. First, the catalyst slurry A was coated onto a cordierite monolith substrate (0.12 L, 400 cells) and had redundant slurry on the cells removed by airflow. The catalyst slurry A was dried at 130° C. and then baked at 400° C. for 1 hour, thus obtaining the first catalyst layer with a coating weight of 80 g/L.

Next, the catalyst slurry C was coated onto the first catalyst layer and had redundant slurry removed by airflow. The slurry C was dried at 130° C. and then baked at 400° C. for 1 hour, thus obtaining the second catalyst layer with a coating weight of 80 g/L.

COMPARATIVE EXAMPLE 6

In order to manufacture an exhaust gas purifying catalyst of Comparative Example 6, first, a slurry for the first catalyst layer formed in contact with the wall of the substrate was produced. The process in which the slurry for the first catalyst layer was produced was as follows. 166.4 g of the catalyst powder A, 52.8 g of cerium oxide powder, 9.8 g of γ-alumina powder, 21 g of alumina sol, 240 g of water, and 10 g of nitric acid were put into a magnetic ball mill to be mixed and ground, thus obtaining a catalyst slurry A. The average particle size of the catalyst slurry A was 3 µm.

Next, a slurry for the second catalyst layer applied on the first catalyst layer was produced. The process in which the slurry for the second catalyst layer was produced was as follows. 58.8 g of the catalyst powder A, 171.4 g of γ-alumina powder, 14.8 g of alumina sol, 210 g of water, and 10 g of nitric acid were put into a magnetic ball mill to be mixed and ground, thus obtaining a catalyst slurry B. The average particle size of the catalyst slurry B was 3 µm.

Separately from the catalyst slurry B, 5 g of alumina fibers (α-alumina fibers, fiber diameter: 5 µm) as the roughening material was then dispersed in 30 g of water and stirred. The obtained liquid was then put into the catalyst slurry B and further stirred, thus obtaining a catalyst slurry C.

Next, the slurry (catalyst slurry A) for the first catalyst layer and the slurry (catalyst slurry C) for the second catalyst layer were applied to the substrate to produce the first and second catalyst layers. The process in which the first and second catalyst layers were produced was as follows. First, the catalyst slurry A was coated onto a cordierite monolith substrate (0.12 L, 400 cells) and had redundant slurry in the cells removed by airflow. The catalyst slurry A was dried at 130° C. and then baked at 400° C. for 1 hour, thus obtaining the first catalyst layer with a coating weight of 80 g/L.

Next, the catalyst slurry C was coated onto the first catalyst layer and had redundant slurry in the cells removed by airflow. The slurry C was dried at 130° C. and then baked at 400° C. for 1 hour, thus obtaining the second catalyst layer with a coating weight of 80 g/L.

For Examples 7, 20, and 21 and Comparative Examples 5 and 6, results of examination of the temperature (T50) when the HC conversion rate was 50% are shown in Table 8.

TABLE 8

|  | Maximum Height of Profile (µm) | Carrier/ Roughening material | Temperature at 50% HC Conversion Rate (° C.) |
|---|---|---|---|
| Example 7 | 5-20 | 82/18 | 373 |
| Example 20 | 15-50 | 64/36 | 375 |
| Example 21 | 3-10 | 97/3 | 377 |
| Comparative Example 5 | 30-60 | 58/42 | 396 |
| Comparative Example 6 | less than 2 | 99/1 | 402 |

As is apparent from Table 8, Examples 7, 20, and 21, in each of which the weight ratio of the carrier supporting noble metal to the roughening material was in a range between 60/40 to 98/2, all provided excellent purification performance. On the other hand, Comparative Example 5, whose weight ratio was 58/42, had purification performance inferior to that of Examples 7, 20, and 21 because the amount of the catalytic component thereof is small. Comparative Example 6, whose weight ratio was 99/1, had roughness with a maximum height of profile of less than 2 µm in the surface of the second catalyst layer, and the purification performance thereof was inferior to Examples 7, 20, and 21.

COMPARATIVE EXAMPLE 7

Comparative Example 7 is an example in which carrier particles (catalyst particles) supporting noble metal were not contained in the top layer which came into contact with exhaust gas but contained in the roughness performing material.

In order to manufacture the exhaust gas purifying catalyst of Comparative Example 7, first, a slurry for the first catalyst layer was produced. The process in which the slurry for the first catalyst layer was produced was as follows. Cerium acetate aqueous solution was supported on γ-alumina with a specific surface area of about 200 m$^2$/g so that the support concentration was 12 wt % in terms of $CeO_2$. The obtained liquid was dried at 120° C. for 1 day and baked at 400° C. for 1 hour, thus obtaining catalyst powder A. 166.5 g of the catalyst powder A, 52.8 g of cerium oxide powder, 9.8 g of γ-alumina powder, 21 g of alumina sol, 240 g of water, and 10 g of nitric acid were put into a magnetic ball mill to be mixed and ground, thus obtaining a catalyst slurry A. The average particle size of the catalyst slurry A was 3 µm.

Next, a slurry for the second catalyst layer applied on the first catalyst layer was produced. The process in which the slurry for the second catalyst layer was produced was as follows. 58.8 g of the catalyst powder A, 176.4 g of γ-alumina powder, 14.8 g of alumina sol, 240 g of water, and 10 g of nitric acid were put into a magnetic ball mill to be mixed and ground, thus obtaining a catalyst slurry B. The average particle size of the catalyst slurry B was 3 µm.

Next, a slurry for a fiber layer formed on the second catalyst layer was produced. The production process thereof was as follows. 235 g of alumina fibers (α-alumina fibers, fiber diameter: 5 µm) as the roughening material and 15 g of alumina sol were then dispersed in 240 g of water and 10 g of nitric acid and then stirred, thus obtaining a catalyst slurry C.

Next, the slurry (catalyst slurry A) for the first catalyst layer, the slurry (catalyst slurry B) for the second catalyst layer, and the slurry (catalyst slurry C) for the fiber layer were sequentially applied to the substrate to produce the first and second catalyst layers and fiber layer. The process in which the first and second catalyst layers were produced was as follows. First, the catalyst slurry A was coated onto a cordierite monolith substrate (0.12 L, 400 cells) and had redundant slurry in the cells removed by airflow. The catalyst slurry A was dried at 130° C. and then baked at 400° C. for 1 hour, thus obtaining the first catalyst layer with a coating weight of 80 g/L.

Next, the catalyst slurry B was coated onto the first catalyst layer and had redundant slurry in the cells removed by airflow. The slurry B was dried at 130° C. and then baked at 400° C. for 1 hour, thus obtaining the second catalyst layer with a coating weight of 50 g/L.

Next, the catalyst slurry C was coated onto the second catalyst layer and had redundant slurry in the cells removed by airflow. The slurry C was dried at 130° C. and then baked at 400° C. for 1 hour, thus obtaining the fiber layer with a coating weight of 30 g/L. This fiber layer did not contain a carrier which supports noble metal.

Next, to allow noble metal to be supported in the first and second catalyst layer, the cordierite monolith substrate on which the aforementioned layers were formed was immersed in tetraammineplatinum hydroxide solution, dried at 130° C., and then baked at 400° C. for 1 hour, thus obtaining the catalyst.

For Comparative Example 7, results of examination of the temperature (T50) when the HC conversion rate was 50% are shown in Table 9 together with the value of Example 7.

TABLE 9

|  | Maximum Height of Profile (μm) | Top layer Constituent | Temperature at 50% HC Conversion Rate (° C.) |
|---|---|---|---|
| Example 7 | 5-20 | Fiber + Catalyst Layer | 373 |
| Comparative Example 7 | 3-10 | Only Fiber | 408 |

As is apparent from Table 9, Comparative Example 7, in which the top layer of the catalyst contained only fibers, was inferior in purification performance to Example 7. This is considered to be because noble metal was little attached to the fibers and attached noble metal was subject to sintering due to use of the catalyst.

The entire content of a Japanese Patent Application No. P2005-314519 with a filing date of Oct. 28, 2005 is herein incorporated by reference.

Although the invention has been described above by reference to certain embodiments of the invention, the invention is not limited to the embodiments described above and modifications may become apparent to these skilled in the art, in light of the teachings herein. The scope of the invention is defined with reference to the following claims.

What is claimed is:

1. An exhaust gas purifying catalyst, comprising:
a substrate; and
a catalyst layer formed on an inner wall of the substrate and comprising at least a single layer, the catalyst layer containing a carrier supporting a noble metal,
wherein a maximum height of profile of a surface of a top layer in the catalyst layer is greater than or equal to 2 μm and less than or equal to 50 μm, and
wherein the top layer contains the carrier supporting the noble metal and a roughening material comprising a fiber of an inorganic material.

2. An exhaust gas purifying catalyst according to claim 1, wherein the roughening material is contained in a range from the surface of the top layer to half of an entire thickness of the catalyst layer in terms of a thickness direction of the catalyst layer.

3. An exhaust gas purifying catalyst according to claim 1, wherein the roughening material is contained in the top layer among a plurality of layers of the catalyst layer, and
a ratio of a thickness of the catalyst layer other than the top layer containing the roughening material to a thickness of the top layer containing the roughening material is in a range from 50/50 to 95/5.

4. An exhaust gas purifying catalyst according to claim 1, wherein the fiber contains 80 wt % or more of α-Al$_2$O$_3$.

5. An exhaust gas purifying catalyst according to claim 1, wherein a cross-sectional diameter of the fiber is not less than 3 μm.

6. An exhaust gas purifying catalyst according to claim 1, wherein the top layer further contains a particle of the inorganic material as the roughening material, and
an average particle size of the particle of the inorganic material is twice or more an average particle size of the carrier in the top layer.

7. An exhaust gas purifying catalyst according to claim 6, wherein the particle of the inorganic material is an oxide of at least one metal selected from the group consisting of aluminum, cerium, zirconium, and titanium.

8. An exhaust gas purifying catalyst according to claim 6, wherein the particle of the inorganic material contains α-Al$_2$O$_3$.

9. An exhaust gas purifying catalyst according to claim 1, wherein a weight ratio of the carrier in the catalyst layer to the roughening material is in a range from 98/2 to 60/40.

10. An exhaust gas purifying catalyst according to claim 1, wherein an average particle size of the carrier is greater than or equal to 2 μm and less than or equal to 6 μm.

11. An exhaust gas purifying catalyst according to claim 1, wherein the noble metal is at least one selected from the group consisting of platinum, palladium, and rhodium, and
the carrier is an oxide of at least one metal selected from the group consisting of aluminum, cerium, zirconium, and lanthanum.

12. A method of manufacturing an exhaust gas purifying catalyst according to claim 1, comprising:
preparing a powder composed of oxide of a carrier, which supports noble metal;
preparing a slurry containing the oxide powder of the carrier and a roughening material; and
applying the slurry on an inner wall of a substrate, followed by drying and baking to form a catalyst layer.

* * * * *